United States Patent
Wang et al.

(10) Patent No.: US 11,928,127 B2
(45) Date of Patent: Mar. 12, 2024

(54) DYNAMIC REPLICATION BASED ON IDENTITY

(71) Applicant: International Business Machines Corporation, Armonk, NY (US)

(72) Inventors: Xin Wang, Beijing (CN); Yong Zheng, Beijing (CN); Xue Sheng Li, Beijing (CN); Li Xia Liu, Beijing (CN); Fang Yuan Cheng, Beijing (CN); Shuo Feng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 16/452,618

(22) Filed: Jun. 26, 2019

(65) Prior Publication Data
US 2020/0409973 A1  Dec. 31, 2020

(51) Int. Cl.
| | |
|---|---|
| *G06F 16/27* | (2019.01) |
| *G06F 16/14* | (2019.01) |
| *G06F 16/18* | (2019.01) |
| *G06F 16/182* | (2019.01) |

(52) U.S. Cl.
CPC .............. *G06F 16/27* (2019.01); *G06F 16/14* (2019.01); *G06F 16/184* (2019.01)

(58) Field of Classification Search
CPC ...... G06F 16/27; G06F 16/273; G06F 16/275; G06F 16/14; G06F 16/184
USPC .................................................. 707/626–639
See application file for complete search history.

(56) References Cited

U.S. PATENT DOCUMENTS

| | | | |
|---|---|---|---|
| 7,792,797 B2 * | 9/2010 | Hansen | G06F 16/93 707/634 |
| 8,983,899 B1 | 3/2015 | Ghait | |
| 9,237,074 B1 * | 1/2016 | Sampath | H04L 61/3015 |
| 10,061,657 B1 * | 8/2018 | Chopra | G06F 11/1461 |
| 10,310,767 B1 * | 6/2019 | Chopra | G06F 9/45558 |
| 2004/0205152 A1 | 10/2004 | Yasuda | |
| 2006/0031927 A1 * | 2/2006 | Mizuno | H04L 63/102 726/11 |
| 2008/0222159 A1 * | 9/2008 | Aranha | G06F 16/21 |
| 2015/0088825 A1 * | 3/2015 | Bloom | G06F 16/00 707/634 |
| 2016/0077926 A1 * | 3/2016 | Mutalik | G06F 3/0641 711/162 |

(Continued)

FOREIGN PATENT DOCUMENTS

CN  107506231 A  * 12/2017  .......... G06F 11/1448

OTHER PUBLICATIONS

Hegde, Smita, "Replication in Distributed File Systems", Department of Computer Science, University of Texas at Arlington, 12 pages.

*Primary Examiner* — Hares Jami
(74) *Attorney, Agent, or Firm* — Edward J. Wixted, III

(57) ABSTRACT

In response to receiving a request for an identity key from a first entity, an identity key for the first entity is generated. A first request from the first entity to replicate a set of data is received. The generated identity key for the first entity is added to the metadata of the set of data requested to be replicated. A determination is made whether a replication rule exists for the first entity. In response to determining that a replication rule exists for the first entity, the set of data is replicated according to the replication rule for the first entity.

20 Claims, 4 Drawing Sheets

(56) References Cited

U.S. PATENT DOCUMENTS

2017/0123935 A1* 5/2017 Pandit ..................... G06F 16/27
2017/0264681 A1* 9/2017 Apte ..................... H04W 12/08

* cited by examiner

DYNAMIC REPLICATION BASED ON IDENTITY

BACKGROUND

The present invention relates generally to the field of data replication, and more particularly to managing dynamic data replication based on identity.

Data in a distributed file system is distributed across multiple storage nodes, each of the multiple storage nodes interconnected with one another via a type of network. To prevent data loss caused by failure of a storage node, multiple copies of the same data are stored to multiple, different storage nodes. This type of multiple storage is called data replication.

SUMMARY OF THE INVENTION

Embodiments of the present invention include an approach for managing dynamic data replication based on identity. In one embodiment, in response to receiving a request for an identity key from a first entity, an identity key for the first entity is generated. A first request from the first entity to replicate a set of data is received. The generated identity key for the first entity is added to the metadata of the set of data requested to be replicated. A determination is made whether a replication rule exists for the first entity. In response to determining that a replication rule exists for the first entity, the set of data is replicated according to the replication rule for the first entity.

DETAILED DESCRIPTION

Current methods of data replication are inflexible and too often require manual intervention. Further, the current methods are inconvenient to use with complex data replication instances. Replication policy has to be designed on a case by case basis as a universal replication policy cannot be used for all distributed file systems within an enterprise.

Embodiments of the present invention recognize that there may be a method, computer program product, and computer system for enabling the management of dynamic data replication based on identity. In an embodiment, the method, computer program product, and computer system can create an identity key for the entity saving data. A database of replication rules for a plurality of entities is maintained. When an entity inputs a command to save (i.e., replicate) data, the method, computer program product, and computer system can query the database, based on the entity identity, and replicate the data based on the appropriate replication rule.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
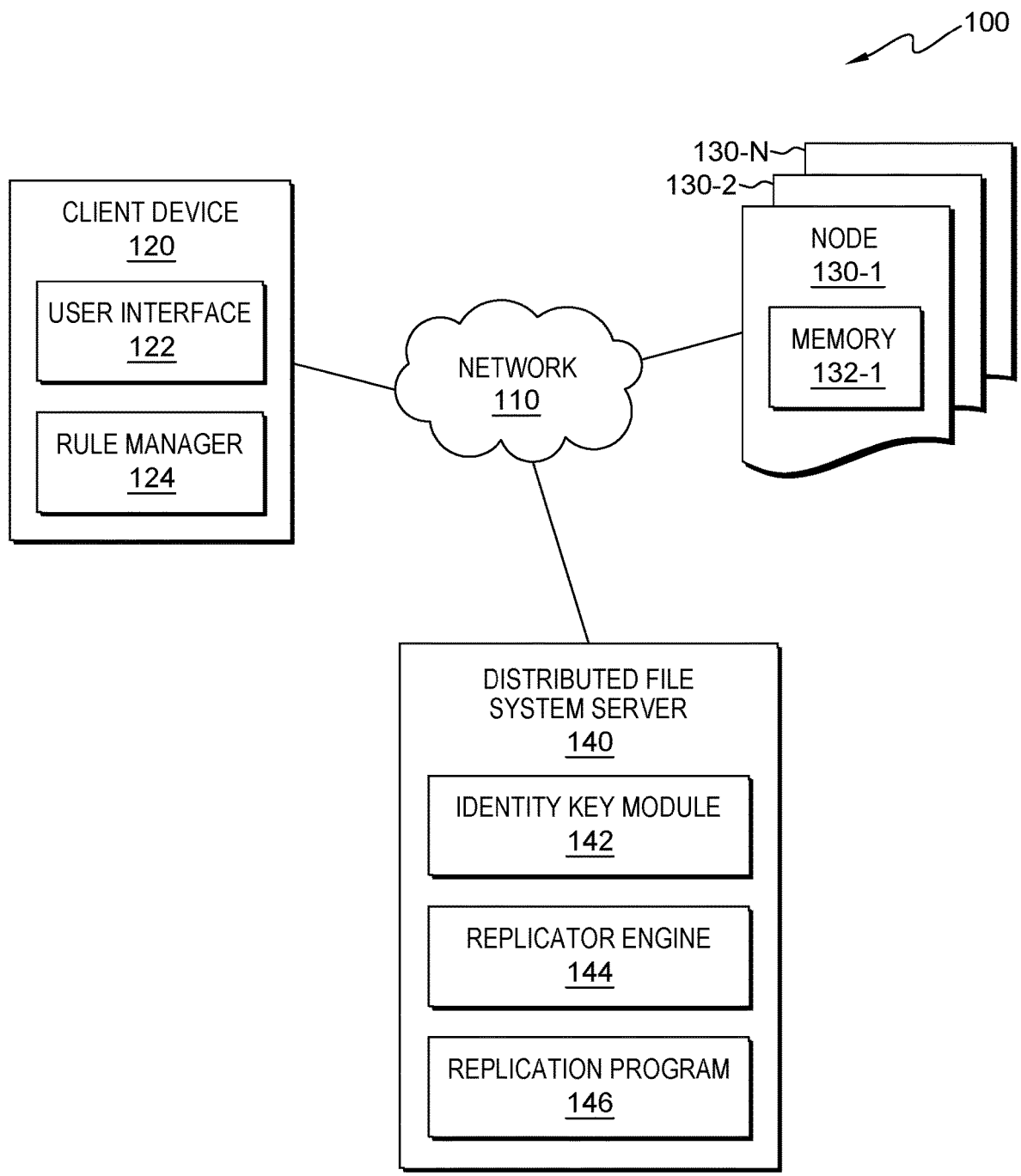
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120, node 130-N, and distributed file system server (DFSS) 140, interconnected by network 110. In example embodiments, computing environment 100 includes other computing devices (not shown in FIG. 1) such as smartwatches, cell phones, smartphones, wearable technology, phablets, tablet computers, laptop computers, desktop computers, other computer servers or any other computer system known in the art, interconnected with client device 120, node 130-N, and DFSS 140 over network 110.

In embodiments of the present invention, client device 120, node 130-N, and DFSS 140 are connected to network 110, which enables client device 120, node 130-N, and DFSS 140 to access other computing devices and/or data not directly stored on client device 120, node 130-N, and DFSS 140. Network 110 may be, for example, a short-range, low power wireless connection, a local area network (LAN), a telecommunications network, a wide area network (WAN) such as the Internet, or any combination of the three, and include wired, wireless, or fiber optic connections. According to an embodiment, network 110 is capable of being open, password protected, encrypted, unencrypted, or any combination. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120, node 130-N, and DFSS 140, and any other computing devices (not shown in FIG. 1) connected to network 110, in accordance with embodiments of the present invention. In an embodiment, data received by another computing device (not shown in FIG. 1) in computing environment 100 is communicated to client device 120, node 130-N, and DFSS 140 via network 110.

In embodiments of the present invention, client device 120 may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. In certain embodiments, client device 120 represents a computer system utilizing clustered computers and components (e.g., database server computers, application server computers, etc.) that act as a single pool of seamless resources when accessed by elements of computing environment 100. In general, client device 120 is representative of any electronic device or combination of electronic devices capable of executing computer readable program instructions. In an embodiment, computing environment 100 includes any number of client device 120. Client device 120 includes components as depicted and described in further detail with respect to FIG. 4, in accordance with embodiments of the present invention. Client device 120 also includes user interface (UI) 122 and rule manager 124.

In an embodiment, user interface 122 provides an interface between a user of client device 120, node 130-N, and DFSS 140. User interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 may also be mobile application software that provides an interface between a user of client device 120, node 130-N, and DFSS 140. Mobile application software, or an "app," is a computer program designed to run on smart phones, tablet computers and other mobile devices. User interface 122 enables a user of client device 120 to interact with node 130-N, DFSS 140, with Internet of Things (IoT) devices, and with other computing device not shown in FIG. 1.

According to embodiments of the present invention, rule manager 124 may be a database of data replication rules organized by entity identity. Data replication rules can be stored to, deleted from, or modified within rule manager 124 by a user, a plurality of users, an application, DFSS 140, etc. In an embodiment, rule manager 124 is pre-populated with rules for one or more entities. In another embodiment, rule manager 124 receives rules during the replication of data and saves said rules to populate rule manager 124. Examples of data replication rules stored to rule manger 124 can include, but are not limited to, examples such as (i) data from a first user should have three copies of the data in the distributed file system, (ii) data from a first group of two or more users should have two copies of the data in the distributed file system, and (iii) data generated by a first application requires only one copy of the data in the distributed file system. When required, rule manager 124 may translate one or more rules written in human readable form to an internal format required by replication engine 144.

According to embodiments of the present invention, node 130-N (which is representative of node 130-1, 130-2, etc. and in this paper, discussion concerning node 130-N is applicable for all the plurality of node 130-N) may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. In certain embodiments, node 130-N represents a computer system utilizing clustered computers and components (e.g., database server computers, application server computers, etc.) that act as a single pool of seamless resources when accessed by elements of computing environment 100. In general, node 130-N is representative of any electronic device or combination of electronic devices capable of executing computer readable program instructions. In an embodiment, computing environment 100 includes any number of node 130-N. Node 130-N may include components as depicted and described in further detail with respect to FIG. 4, in accordance with embodiments of the present invention. Node 130-N also includes memory 132-N.

In an embodiment, memory 132-N is storage that can be written to and/or read by replication program 146, and any other programs and applications on client device 120 and DFSS 140. In one embodiment, memory 132-N resides on node 130-N. In other embodiments, memory 132-N may reside on client device 120 or any other device (not shown) in computing environment 100, in cloud storage or on another computing device accessible via network 110. In yet another embodiment, memory 132-N may represent multiple storage devices within node 130-N. Memory 132-N may be implemented using any volatile or non-volatile storage media for storing information, as known in the art. For example, memory 132-N may be implemented with a tape library, optical library, one or more independent hard disk drives, multiple hard disk drives in a redundant array of independent disks (RAID), solid-state drives (SSD), or random-access memory (RAM). Similarly, memory 132-N may be implemented with any suitable storage architecture known in the art, such as a relational database, an object-oriented database, or one or more tables. In an embodiment of the present invention, replication program 146, and any other programs and applications (not shown in FIG. 1) operating on node 130-N may store, read, modify, or write data to memory 132-N. In an embodiment of the present invention, data stored to memory 132-N includes, but is not limited to, multiple copies of replicated data on node 130-N within computing environment 100.

According to embodiments of the present invention, distributed file system server (DFSS) 140 may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of (i) communicating with any other computing device within computing environment 100 and (ii) managing a plurality of nodes within computing environment 100 (i.e., a distributed file system). In certain embodiments, DFSS 140 represents a computer system utilizing clustered computers and components (e.g., database server computers, application server computers, etc.) that act as a single pool of seamless resources when accessed by elements of computing environment 100. In general, DFSS 140 is representative of any electronic device or combination of electronic devices capable of executing computer readable program instructions. In an embodiment, computing environment 100 includes any number of DFSS 140. DFSS 140 includes components as depicted and described in further detail with respect to FIG. 4, in accordance with embodiments of the present invention. DFSS 140 includes identity key module 142, replicator engine 144, and replication program 146.

In an embodiment, identity key module 142 may be a program, database, sub-system, stand-alone software, etc. used to issue and manage identity keys for a plurality of entities. In an embodiment, an identity key is a unique identifier associated with an entity replicating data with the distributed file system. In the embodiment, an entity may be a user, group of users, an application, a plurality of applications, etc. According to an embodiment, example identity keys can include, but are not limited to, a user name, a user identification, an application name, a process identification, a key issued by an authentication service, a random-generated alphanumeric string, a cryptographic key, etc. In an embodiment, identity key module 142 maintains a database of issued identity keys based on the entity requesting the identity key.

According to embodiments of the present invention, replicator engine 144 functions to replicate data within computing environment 100 (i.e., a distributed file system) following replication rules stored to rule manager 124. In an embodiment, replicator engine 144 can further re-replicate data as needed when one or more rules in rule manager 124 are updated or deleted by an entity. In the embodiment, re-replication can occur automatically when a rule is updated or deleted, when prompted by a user, and when prompted by a program such as replication program 146.

In an embodiment, replication program 146 may be a program, a subprogram of a larger program, an application, a plurality of applications, or mobile application software, which functions to provide predictive vulnerability management of disconnected endpoints in enterprise systems. A program is a sequence of instructions written by a programmer to perform a specific task. In an embodiment, replication program 146 runs by itself. In other embodiments, replication program 146 depends on system software (not shown in FIG. 1) to execute. In one embodiment, replication program 146 functions as a stand-alone program residing on DFSS 140. In another embodiment, replication program 146 works in conjunction with other programs, applications, etc., found in computing environment 100. In yet another embodiment, replication program 146 is found on client device 120. In yet another embodiment, replication program 146 is found on other computing devices (not shown in FIG. 1) in computing environment 100, which are interconnected to DFSS 140 via network 110.

In an embodiment, an identity key is generated and associated with the requesting entity. Upon receiving a request to replicate data in a distributed file system, a rules database is queried based on the entity requesting the data replication. If a rule is identified, the rule is passed to a replicator engine for use in the replication process. If a rule is not identified, the replication process follows a default rule.

Figure 2:
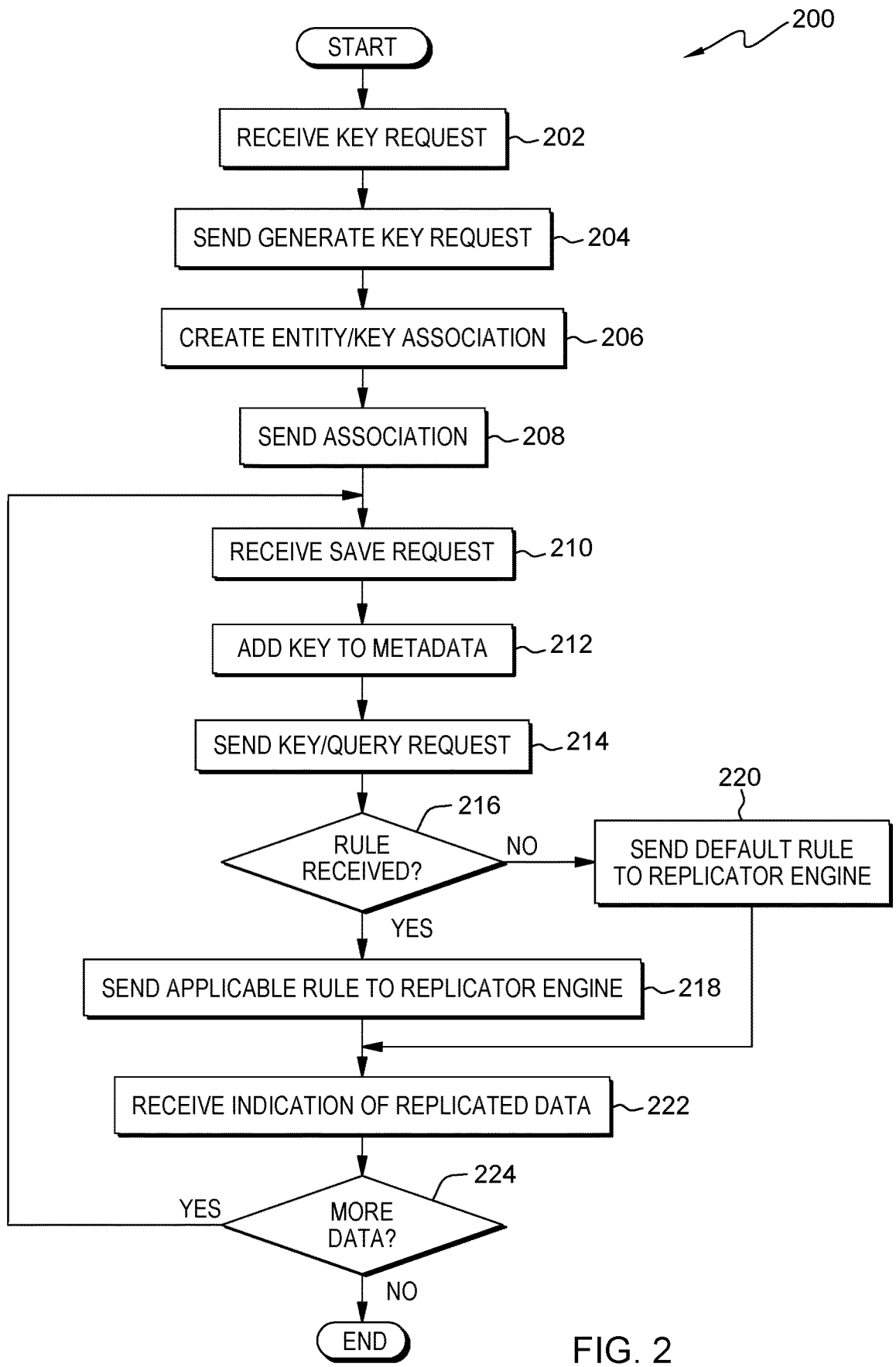
FIG. 2 depicts a flowchart of a program for managing dynamic data replication based on identity, in accordance with an embodiment of the present invention.

FIG. 2 is a flowchart of workflow 200 depicting a method for managing dynamic data replication based on identity. In one embodiment, the method of workflow 200 is performed by replication program 146. In an alternative embodiment, the method of workflow 200 is performed by any other program working with replication program 146. In an embodiment, a user, via user interface 122, invokes workflow 200 upon accessing rule manager 124. In an alternative embodiment, a user invokes workflow 200 upon accessing replication program 146 on DFSS 140 via network 110.

In an embodiment, replication program 146 receives key request (step 202). In other words, replication program 146 receives an identity key request from an entity. In an embodiment, the request can be from a user, such as a system administrator. In another embodiment, the request can be from an entity, such as an application or program. According to an embodiment of the present invention, replication program 146 receives a key request over network 110 from a user of client device 120 who made the request via user interface 122. For example, a program receives a request from a user named Fred for an identity key.

In an embodiment, replication program 146 sends generate key request (step 204). In other words, responsive to receiving the key request, replication program 146 sends a request to generate the identity key. In an embodiment, upon receiving the request from replication program 146 to generate an identity key, the identity key is generated, stored, and the generated identity key is sent to replication program 146. According to an embodiment, replication program 146 sends the request to generate the identity key over network 110 to identity key module 142 on distributed file system server (DFSS) 140. In the embodiment, the identity key is generated, stored, and sent to replication program 146. For example, the program requests an identity key for Fred from an application that creates and maintains identity keys. The identity key "F-key1" is created & stored by the application and sent by the application back to the program.

In an embodiment, replication program 146 creates entity/key association (step 206). In other words, responsive to receiving the generated identity key from identity key module 142, replication program 146 creates an association between the received identity key and the entity that requested the identity key. According to an embodiment, the created association is maintained (i.e., stored) by replication program 146 in an available memory accessible by replication program 146. In an embodiment, the created association is a simple pairing of the entity and identity key. In another embodiment, the created association is a hidden association (e.g., the simple pairing is created and then given a code name such that the entity and identity key are hidden and only known via the code name). According to an embodiment of the present invention, replication program 146 creates an association between the received identity key and the entity; the created association is maintained by replication program 146. For example, the association "Fred:F-key1" is created by the program for the entity Fred and the generated identity key "F-key1".

In an embodiment, replication program 146 sends association (step 208). In other words, replication program 146 sends the created association between the entity and the identity key to rule manger 124 via network 110. According to an embodiment of the present invention, the created association is sent unencrypted. According to another embodiment, the created association is sent encrypted. Responsive to receiving the created association from replication program 146, rule manager 124 stores the received association for subsequent use by rule manager 124. In an embodiment, replication program 146 sends the created entity and identity key association over network 110 to rule manger 124 where rule manager 124 stores the association. For example, the program sends "Fred:F-key1" to a replication rule database where it is stored for later use.

In an embodiment, replication program 146 receives save request (step 210). In other words, replication program 146 receives a request from the entity to save (i.e., replicate) data within computing environment 100 (i.e., the distributed file system). In an embodiment, the received request is received directly from the entity. In another embodiment, the received request is received indirectly from the entity (e.g., from an application utilized by the entity). In an embodiment, the save request is directed to new data (i.e., data that has yet to be saved in the distributed file system). In another embodiment, the save request is directed to previously saved data (i.e., data within the distributed file system). According to an embodiment, replication program 146 receives a request over network 110 from a user of client device 120 to save data to node 130-N. For example, the program receives a request from Fred to save the data "EMPLOYEE RECORDS".

In an embodiment, replication program 146 adds key to data metadata (step 212). In other words, responsive to receiving the request to save data, replication program 146 adds the generated identity key to the metadata of the data to be saved. In an embodiment, adding the identity key to the metadata of the data to be saved enables replication program 146 to identify data within the distributed file system (e.g., when existing data require re-replication due to a rule update). According to an embodiment, replication program 146 adds the relevant identity key to the metadata of the data received from the user of client device 120. For example, the identity key "F-Key1" is added to the metadata of the data "EMPLOYEE RECORDS".

In an embodiment, replication program 146 sends key/query request (step 214). In other words, responsive to receiving the request to save data, replication program 146 sends the identity key associated with the save request as well as a query request to rule manager 124. In an embodiment, the query request to rule manager 124 requests rule manager 124 to query, based on the sent identity key, the maintained replication rules to identify existing replication rules for the entity. In the embodiment, rule manager 124 utilizes the previously received entity-identity key association to identify the appropriate entity prior to querying the maintained replication rules. According to an embodiment of the present invention, if rule manager 124 finds a replication rule for the identified entity, rule manager 124 sends the applicable replication rule to replication program 146. According to the embodiment, if rule manager 124 does not find a replication rule for the identified entity, rule manager 124 sends a reply that no replication rule was found for the entity to replication program 146. In an embodiment, replication program 146 sends over network 110 the identity key associated with the received save request and a query request to identify applicable replication rules to rule manager 124 on client device 120. In the embodiment, rule manager 124 identifies the entity via the entity-identity key association and queries the maintained replication rules for replication rules applicable to the entity. For example, the rules database receives the sent identity key "F-key1" from the program. Based on "F-key1" and the previously received association "Fred:F-key1", the rules database identifies Fred as the entity and searches to replication rules applicable to Fred.

In an embodiment, replication program 146 determines whether a rule is received (decision step 216). In other words, replication program 146 determines whether an applicable replication rule was received from rule manager 124. In an embodiment (decision step 216, NO branch), replication program 146 determines that an applicable replication rule was not received from rule manager 124; therefore, replication program 146 proceeds to step 220 to send the default replication rule to the replication engine. In the embodiment (decision step 216, YES branch), replication program 146 determines that an applicable replication rule was received from rule manager 124; therefore, replication program 146 proceeds to step 218 to send the applicable rule to the replication engine.

In an embodiment, replication program 146 sends applicable rule to replicator engine (step 218). In other words, responsive to receiving an applicable replication rule from rule manager 124, replication program 146 sends the received replication rule (i.e., the applicable rule) to replicator engine 144. In an embodiment, the applicable rule is sent unencrypted. In another embodiment, the applicable rule is sent encrypted. According to an embodiment, the applicable rule is a single replication rule. According to another embodiment, the applicable rule is two or more replication rules grouped as a set. In an embodiment, replication program 146 sends the applicable replication rule received from rule manager 124 to replicator engine 144 on DFSS 140. For example, the program sends "FRED-RULE" to a replication tool for utilization when saving the data "EMPLOYEE RECORDS".

In an embodiment, replication program 146 sends default rule to replicator engine (step 220). In other words, responsive to receiving a reply from rule manager 124 that no replication rule was found for the entity, replication program 146 sends a default replication rule to replicator engine 144. In an embodiment, the default rule is sent unencrypted. In another embodiment, the default rule is sent encrypted. According to an embodiment, the default rule is a single replication rule. According to another embodiment, the default rule is two or more replication rules grouped as a set. In an embodiment, replication program 146 sends the default replication rule received from rule manager 124 to replicator engine 144 on DFSS 140. For example, the program sends "DEFAULT" to a replication tool for utilization when saving the data "EMPLOYEE RECORDS".

In an embodiment, replication program 146 receives indication of replicated data (step 222). In other words, responsive to receiving (i) the applicable replication rule or (ii) the default replication rule, replicator engine 144 replicates the data following the appropriate rule. When the data has been replicated, replication program 146 receives an indication from replicator engine 144 that the replication was completed. In an embodiment, the received indication can be any type of message or notification known in the art (e.g., an e-mail message; a pop-up message; any type of text message; a visual, audible, or haptic notification; etc.). According to an embodiment, replication program 146 receives an indication that replicator engine 144 has used the applicable rule to save (i.e., replicate) the data. For example, the data "EMPLOYEE RECORDS" has been replicated by the replication tool (i) following "FRED-RULE" replication rule (in the case where a rule is found for Fred) or (ii) following the default replication rule (in the case where no rule is found for Fred).

In an embodiment, replication program 146 determines whether more data is available to save (decision step 224). In other words, responsive to receiving an indication that the data has been replicated, replication program 146 determines whether additional data needs to be saved. In an embodiment, (decision step 224, YES branch), replication program 146 determines that more data is available to save; therefore, replication program 146 returns to step 210 to receive an additional save request. In the embodiment (decision step 224, NO branch), replication program 146 determines that more data is not available to save; therefore, replication program 146 ends processing.

Figure 3:
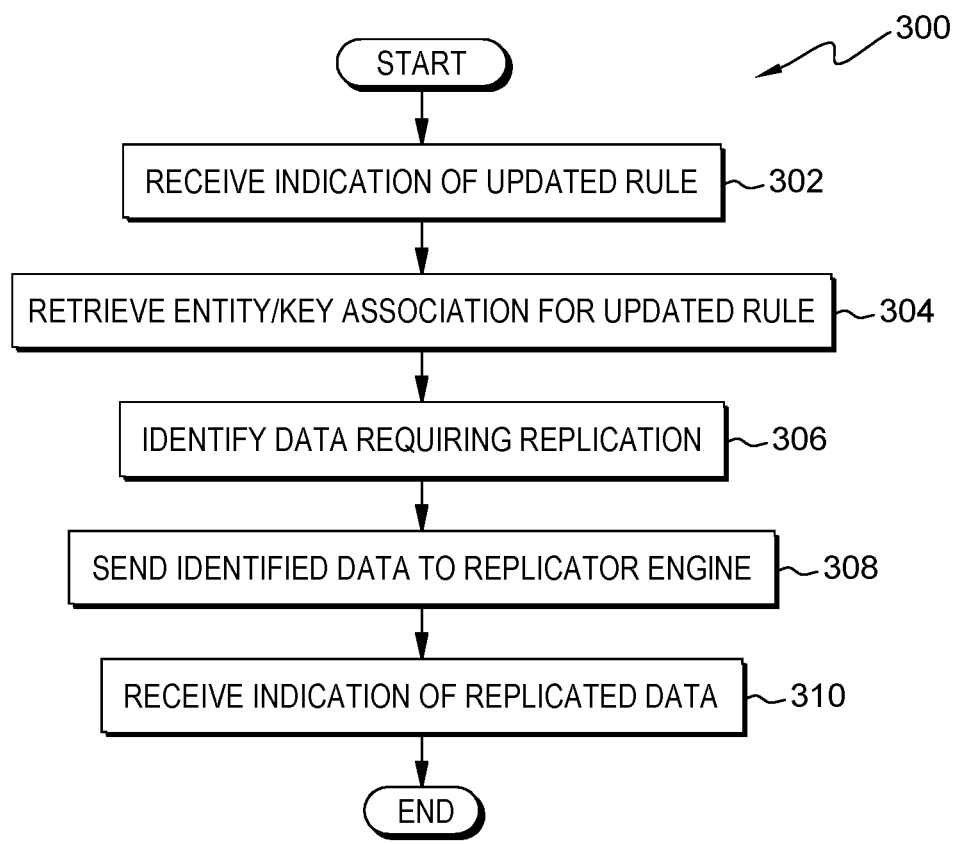
FIG. 3 depicts a flowchart of a program for managing a rule update in a data replication system, in accordance with an embodiment of the present invention.

FIG. 3 is a flowchart of workflow 300 depicting a method for managing a rule update in a data replication system. In one embodiment, the method of workflow 300 is performed by replication program 146. In an alternative embodiment, the method of workflow 300 is performed by any other program working with replication program 146. In an embodiment, a user, via user interface 122, invokes workflow 300 upon accessing rule manager 124. In an alternative embodiment, a user invokes workflow 300 upon accessing replication program 146 on DFSS 140 via network 110.

In an embodiment, replication program 146 receives indication of updated rule (step 302). In other words, replication program 146 receives an indication that one or more rules maintained in rule manager 124 has been changed (i.e., updated, deleted, or newly added) for an entity. In an embodiment, the indication is received from rule manager 124. In another embodiment, the indication is received from a user of client device 120 via user interface 122. In yet another embodiment, the indication is received from node 130-N. In yet another embodiment, the indication is received from replicator engine 144 (e.g., a rule previously used by replicator engine is no longer available). According to an embodiment, replication program 146 receives an indication from rule manager 124 over network 110 of an update to a replication rule. For example, the existing rule "FRED-RULE" for Fred has been updated to "FRED-NEWRULE" in the rule database.

In an embodiment, replication program 146 retrieves entity/key association for updated rule (step 304). In other words, based on the owning entity of the rule, replication program retrieves the appropriate entity and identity key association for the rule that is changing. In an embodiment, responsive to retrieving the entity/key association, replication program 146 may identify the identity key for the entity based on the retrieved association. According to an embodiment of the present invention, replication program 146 retrieves the entity/key association (which was stored when the entity/key association was created) from the accessible memory. Replication program 146 subsequently identifies the identity key from the retrieved entity/key association. For example, the program retrieves the association "Fred: F-key1" and subsequently identifies "F-key1" as the identity key.

In an embodiment, replication program 146 identifies data requiring replication (step 306). In other words, replication program 146 identifies what existing data within the distributed file system requires replication based on the rule update. In an embodiment, the identification may be made based on the identified identity key as said identity key was stored to the metadata of the data during the creation of the identity key and the previous replication of the data. According to an embodiment of the present invention, replication program 146 identifies the data requiring replication within the distributed file system by scanning the existing data stored to memory 132-N on node 130-N and searching for the identified identity key within the metadata of the data. In the embodiment, the identified data is marked for replication. For example, the metadata of the existing data is scanned for the identity key "F-key1"; all data that includes "F-key1" in its metadata is marked for replication.

In an embodiment, replication program 146 sends identified data to replicator engine (step 308). In other words, replication program 146 sends the identified data, marked for replication bases on the identity key in the metadata of the data, to a replicator engine for replication. In an embodiment, the replication is based on the changed replication rule. According to an embodiment of the present invention, replication program 146 sends the data identified via the identity key that is stored to memory 132-N on node 130-N to replicator engine 144 on DFSS 140 for replication following the changed replication rule. For example, the program sends the data identified with the identity key "F-key1" in the metadata for replication following the new replication rule "FRED-NEWRULE".

In an embodiment, replication program 146 receives indication of replicated data (step 310). In other words, replication program 146 receives an indication from replicator engine 144 that the replication was completed following the changed replication rule. In an embodiment, the received indication can be any type of message or notification known in the art (e.g., an e-mail message; a pop-up message; any type of text message; a visual, audible, or haptic notification; etc.). According to an embodiment, replication program 146 receives an indication that replicator engine 144 has used the changed rule to save (i.e., replicate) the data identified via the identity key. For example, the data "EMPLOYEE RECORDS" has been replicated by the replication tool following "FRED-NEWRULE" replication rule.

Figure 4:
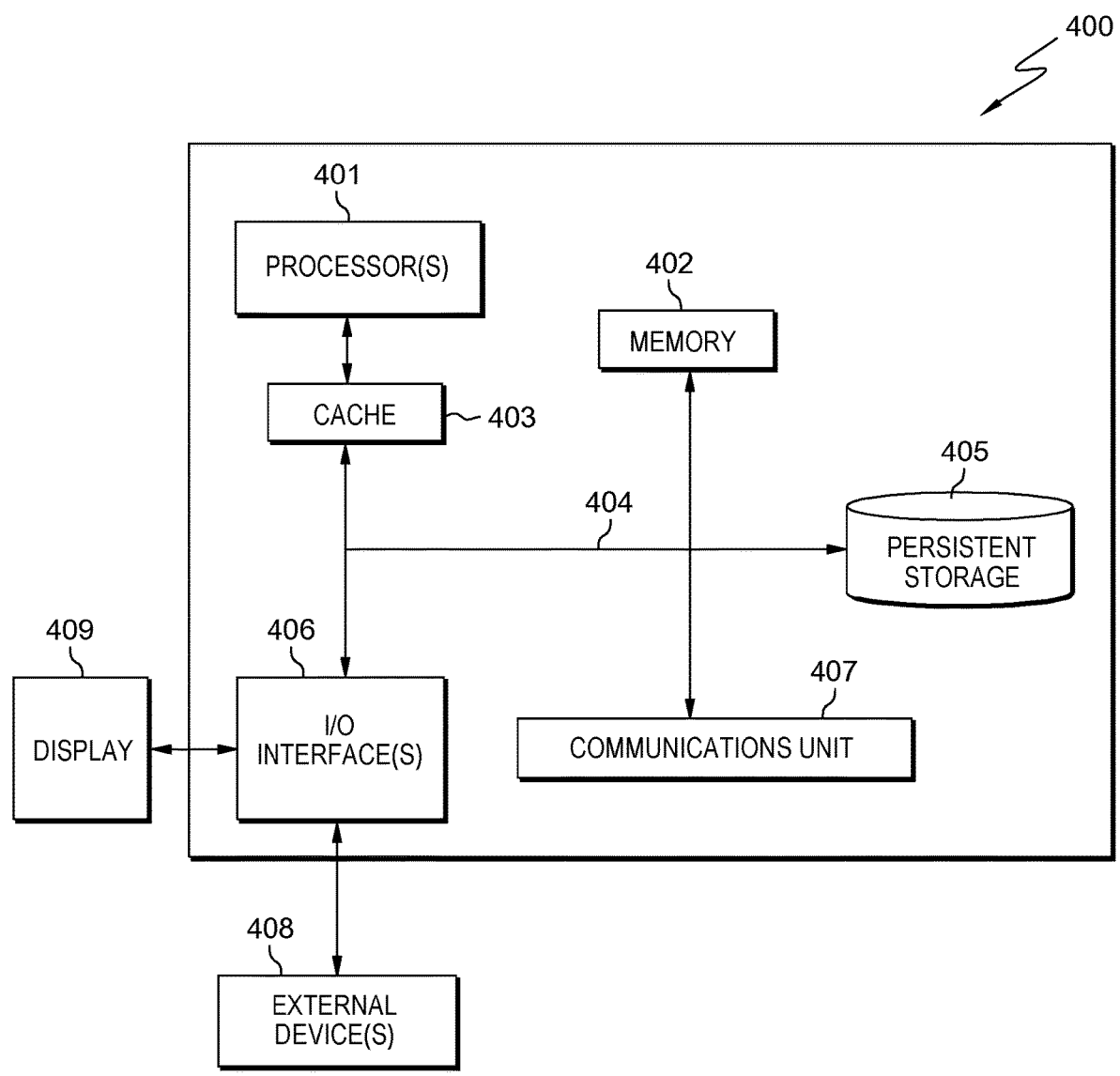
FIG. 4 depicts a block diagram of components of the computing environment of FIG. 1, in accordance with an embodiment of the present invention.

FIG. 4 depicts computer system 400, which is an example of a system that includes replication program 146. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:
   receiving: (i) a request for an identity key and (ii) a replication rule from a first user of a client device;
   responsive to receiving the request for the identity key, generating, by one or more computer processors, the identity key for the first user;
   creating, by one or more computer processors, an association between the first user and the identity key;
   storing, by one or more computer processors, the association;
   receiving, by one or more computer processors, a change to the replication rule;
   responsive to receiving the change:
      identifying, by one or more computer processors, a preexisting first set of data requiring replication by searching a plurality of nodes for the identity key within metadata of the first set of data, wherein each node of the plurality of nodes is a computing device accessible via a network; and
      replicating, by one or more computer processors, in a distributed file system, the first set of data according to the changed replication rule;
   subsequent to receiving the change to the replication rule, receiving, by one or more computer processors, a request from the first user to replicate a second set of data;
   responsive to receiving the request to replicate the second set of data, adding, by one or more computer processors, the identity key to metadata of each item of the second set of data; and
   replicating, by one or more computer processors, in the distributed file system, the second set of data with the identity key added to the metadata of each item of the second set of data according to the changed replication rule for the first user.

2. The computer-implemented method of claim 1, further comprising:
   receiving, by one or more computer processors, an indication that the first set of data has been replicated according to the changed replication rule for the first user.

3. The computer-implemented method of claim 1, wherein generating the identity key for the first user, comprises:
   transmitting, by one or more computer processors, the request for an identity key from the first user to an identity key module, wherein the identity key module generates, manages, and stores a plurality of identity keys; and
   receiving, by one or more computer processors, the identity key from the identity key module.

4. The computer-implemented method of claim 1, further comprising:
   transmitting, by one or more computer processors, the identity key to a rule manager;
   identifying, by one or more computer processors, the first user based on the association;
   querying, by one or more computer processors, a database of replication rules based on the identity key to identify the replication rule for the first user based on the association and the identity key; and
   receiving, by one or more computer processors, the replication rule for the first user.

5. The computer-implemented method of claim 1, further comprising:
   receiving, by one or more computer processors, an indication of an updated replication rule for a second user;
   retrieving, by one or more computer processors, a created association between the second user associated with the updated replication rule and a generated identity key for the second user;
   identifying, by one or more computer processors, a plurality of data requiring replication, wherein:
      the plurality of data requiring replication is identified based on the generated identity key for the second user stored to metadata of the plurality of data; and
      the required replication is based on the updated replication rule for the second user;
   transmitting, by one or more computer processors, the identified plurality of data requiring replication to a replicator engine; and
   receiving, by one or more computer processors, an indication that the identified plurality of data is replicated according to the updated replication rule for the second user.

6. The computer-implemented method of claim 2, further comprising:
   responsive to receiving the indication that the first set of data has been replicated, determining, by one or more computer processors, that more data requires replication; and
   responsive to determining that more data requires replication, receiving, by one or more computer processors, a second request from the first user to replicate the more data.

7. The computer-implemented method of claim 1, wherein creating the association between the first user and the identity key comprises creating, by one or more processors, a hidden association between the first user and the identity key by utilizing a code name.

8. The computer-implemented method of claim 1, wherein the identity key is a unique identifier associated with the first user within the distributed file system.

9. The computer-implemented method of claim 1, further comprising:
   translating, by one or more processors, the replication rule from a human readable form to an internal format required by a replication engine.

10. A computer program product comprising:
    one or more computer readable storage media; and
    program instructions stored on the one or more computer readable storage media, the program instructions comprising:
       program instructions to receive: (i) a request for an identity key and (ii) a replication rule from a first user of a client device;
       program instructions to, responsive to receiving the request for the identity key, generate the identity key for the first user;
       program instructions to create an association between the first user and the identity key;
       program instructions to store the association;
       program instructions to receive a change to the replication rule;
       program instructions to, responsive to receiving the change:

identify a preexisting first set of data requiring replication by searching a plurality of nodes for the identity key within metadata of the first set of data, wherein each node of the plurality of nodes is a computing device accessible via a network; and replicate, in a distributed file system, the first set of data according to the changed replication rule;

program instructions to, subsequent to receiving the change to the replication rule, receive a request from the first user to replicate a second set of data;

program instructions to, responsive to receiving the request to replicate the second set of data, add the identity key to metadata of each item of the second set of data; and program instructions to replicate, in the distributed file system, the second set of data with the identify key added to the metadata of each item of the second set of data according to the changed replication rule for the first user.

11. The computer program product of claim 10, further comprising:
program instructions, stored on the one or more computer readable storage media, to receive an indication that the first set of data has been replicated according to the changed replication rule for the first user.

12. The computer program product of claim 10, wherein program instructions to generate the identity key for the first user comprise:
program instructions to transmit the request for an identity key from the first user to an identity key module, wherein the identity key module generates, manages, and stores a plurality of identity keys; and
program instructions to receive the identity key from the identity key module.

13. The computer program product of claim 10, further comprising:
program instructions, stored on the one or more computer readable storage media, to transmit the identity key to a rule manager;
program instructions, stored on the one or more computer readable storage media, to identify the first user based on the association;
program instructions, stored on the one or more computer readable storage media, to query a database of replication rules based on the identity key to identify the replication rule for the first user based on the association and the identity key; and
program instructions, stored on the one or more computer readable storage media, to receive the replication rule for the first user.

14. The computer program product of claim 10, further comprising program instructions, stored on the one or more computer readable storage media, to:
receive an indication of an updated replication rule for a second user;
retrieve a created association between the second user associated with the updated replication rule and a generated identity key for the second user;
identify a plurality of data requiring replication, wherein:
the plurality of data requiring replication is identified based on the generated identity key for the second user stored to metadata of the plurality of data; and
the required replication is based on the updated replication rule for the second user;
transmit the identified plurality of data requiring replication to a replicator engine; and
receive an indication that the identified plurality of data is replicated according to the updated replication rule for the second user.

15. The computer program product of claim 11, further comprising program instructions, stored on the one or more computer readable storage media, to:
responsive to receiving the indication that the first set of data has been replicated, determine that more data requires replication; and
responsive to determining that more data requires replication, receive a second request from the first user to replicate the more data.

16. A computer system, the computer system comprising:
one or more computer processors;
one or more computer readable storage media; and
program instructions stored on the one or more computer readable storage media for execution by at least one of the one or more computer processors, the program instructions comprising:
program instructions to receive: (i) a request for an identity key and (ii) a replication rule from a first user of a client device;
program instructions to, responsive to receiving the request for the identity key, generate the identity key for the first user;
program instructions to create an association between the first user and the identity key;
program instructions to store the association;
program instructions to receive a change to the replication rule;
program instructions to, responsive to receiving the change:
identify a preexisting first set of data requiring replication by searching a plurality of nodes for the identity key within metadata of the first set of data, wherein each node of the plurality of nodes is a computing device accessible via a network; and
replicate, in a distributed file system, the first set of data according to the changed replication rule;
program instructions to, subsequent to receiving the change to the replication rule, receive a request from the first user to replicate a second set of data;
program instructions to, responsive to receiving the request to replicate the second set of data, add the identity key to metadata of each item of the second set of data; and
program instructions to replicate, in the distributed file system, the second set of data with the identify key added to the metadata of each item of the second set of data according to the changed replication rule for the first user.

17. The computer system of claim 16, further comprising:
program instructions, stored on the one or more computer readable storage media for execution by at least one of the one or more computer processors, to receive an indication that the first set of data has been replicated according to the changed replication rule for the first user.

18. The computer system of claim 16, wherein program instructions to generate the identity key for the first user comprise:
program instructions to transmit the request for an identity key from the first user to an identity key module, wherein the identity key module generates, manages, and stores a plurality of identity keys; and program instructions to receive the identity key from the identity key module.

19. The computer system of claim 16, further comprising:
program instructions, stored on the one or more computer readable storage media for execution by at least one of the one or more computer processors, to transmit the identity key to a rule manager;
program instructions, stored on the one or more computer readable storage media for execution by at least one of the one or more computer processors, to identify the first user based on the association;
program instructions, stored on the one or more computer readable storage media for execution by at least one of the one or more computer processors, to query a database of replication rules based on the identity key to identify the replication rule for the first user based on the association and the identity key; and
program instructions, stored on the one or more computer readable storage media for execution by at least one of the one or more computer processors, to receive the replication rule for the first user.

20. The computer system of claim 16, further comprising program instructions, stored on the one or more computer readable storage media for execution by at least one of the one or more computer processors, to:
receive an indication of an updated replication rule for a second user;
retrieve a created association between the second user associated with the updated replication rule and a generated identity key for the second user;
identify a plurality of data requiring replication, wherein:
the plurality of data requiring replication is identified based on the generated identity key for the second user stored to metadata of the plurality of data; and
the required replication is based on the updated replication rule for the second user;
transmit the identified plurality of data requiring replication to a replicator engine; and
receive an indication that the identified plurality of data is replicated according to the updated replication rule for the second user.

* * * * *